(12) United States Patent
Guild et al.

(10) Patent No.: US 12,367,793 B1
(45) Date of Patent: Jul. 22, 2025

(54) ELECTRONIC DEVICES WITH EDGE ILLUMINATORS

(71) Applicant: Apple Inc., Cupertino, CA (US)

(72) Inventors: Benjamin Guild, San Francisco, CA (US); Ryan D Shelby, Mountain View, CA (US); Benjamin J Grena, San Francisco, CA (US); David M Kindlon, Felton, CA (US); Kathryn P Crews, Menlo Park, CA (US); Storrs T Hoen, Brisbane, CA (US); Yue Chen, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 109 days.

(21) Appl. No.: 18/077,998

(22) Filed: Dec. 8, 2022

Related U.S. Application Data (60) Provisional application No. 63/292,913, filed on Dec. 22, 2021.

(51) Int. Cl.
*G09F 9/33* (2006.01)
*F21V 3/04* (2018.01)
*F21V 7/10* (2006.01)
*F21V 23/00* (2015.01)
*F21V 33/00* (2006.01)
*G06F 1/16* (2006.01)
*F21W 121/06* (2006.01)
(Continued)

(52) U.S. Cl.
CPC .............. *G09F 9/33* (2013.01); *F21V 3/049* (2013.01); *F21V 7/10* (2013.01); *F21V 23/003* (2013.01); *F21V 33/0008* (2013.01); *G06F 1/163* (2013.01); *F21V 2200/10* (2015.01); *F21W 2121/06* (2013.01); *F21Y 2103/10* (2016.08); *F21Y 2115/10* (2016.08); *G06F 3/016* (2013.01)

(58) Field of Classification Search
CPC .......... G09F 9/33; F21V 3/049; F21V 23/003; F21V 7/10
See application file for complete search history.

(56) References Cited

U.S. PATENT DOCUMENTS

D344,411 S * 2/1994 Henry ............................ D3/229
5,568,971 A * 10/1996 Jewell .................... F21V 21/406
362/108

(Continued)

FOREIGN PATENT DOCUMENTS

CA 2978545 A1 3/2019

*Primary Examiner* — Hoi C Lau
(74) *Attorney, Agent, or Firm* — Treyz Law Group, P.C.; Kendall P. Woodruff (57) ABSTRACT

An electronic device such as a wrist band may include a strip of fabric that wraps around a longitudinal axis. A one-dimensional array of light sources may be embedded in the strip of fabric and may emit light parallel to the longitudinal axis to produce edge illumination along an edge of the strip of fabric. Optical structures such as light-diffusing strands, light-diffusing polymer structures, and/or light guides may be located between the light sources and the edge of the strip of fabric to help diffuse light and/or guide light to the edge of the strip of fabric. Light-reflecting layers may be formed on inner surfaces of the fabric. Control circuitry may control the light sources to produce the edge illumination in response to an event occurring on an external electronic device such as a notification on an external display.

20 Claims, 7 Drawing Sheets

(51) Int. Cl.
*F21Y 103/10* (2016.01)
*F21Y 115/10* (2016.01)
*G06F 3/01* (2006.01)

(56) References Cited

U.S. PATENT DOCUMENTS

| | | | | |
|---|---|---|---|---|
| 5,601,356 | A * | 2/1997 | McWilliams | F21L 4/005 224/267 |
| 6,213,619 | B1 * | 4/2001 | Yu | F21V 21/145 362/396 |
| 6,550,930 | B1 * | 4/2003 | Portouche | F21V 21/30 362/269 |
| 6,578,982 | B1 * | 6/2003 | Lynch | A44C 15/0015 362/108 |
| 6,659,618 | B2 | 12/2003 | Waters | |
| 6,992,572 | B1 * | 1/2006 | Lovegrove | B62J 6/055 340/432 |
| 7,071,828 | B2 * | 7/2006 | Wong | G08B 5/38 340/689 |
| 8,303,129 | B1 * | 11/2012 | Thielen | F21V 21/0816 362/108 |
| 8,398,255 | B2 * | 3/2013 | Starogiannis | F21V 21/0885 2/160 |
| 8,550,648 | B2 * | 10/2013 | Smith | F21V 21/0816 362/103 |
| 8,562,165 | B2 * | 10/2013 | Thompson | A41D 19/0157 362/249.05 |
| 9,225,811 | B2 | 12/2015 | Kim et al. | |
| 9,322,544 | B2 * | 4/2016 | Carriere | A44C 15/0015 |
| 9,752,762 | B1 * | 9/2017 | Poe, III | A44C 5/00 |
| 10,175,653 | B1 * | 1/2019 | Bloom | G04B 45/00 |
| 10,254,795 | B2 * | 4/2019 | Huitema | G06F 1/1694 |
| 10,344,924 | B1 * | 7/2019 | Ganahl | F21V 15/04 |
| 10,372,020 | B2 * | 8/2019 | Raskin | G03B 15/02 |
| 10,528,133 | B2 * | 1/2020 | De Nardi | G06F 3/014 |
| 10,551,012 | B2 * | 2/2020 | Schorr, III | F21L 4/005 |
| 10,571,114 | B2 * | 2/2020 | Carriere | A44C 5/0007 |
| 10,595,618 | B2 | 3/2020 | Wang et al. | |
| 10,670,202 | B2 * | 6/2020 | Ganahl | F21V 23/0471 |
| 10,677,436 | B2 * | 6/2020 | Schorr, III | F21V 23/0414 |
| 10,702,030 | B2 * | 7/2020 | Gibson | A44C 15/0015 |
| 10,842,234 | B2 * | 11/2020 | Allan | B26B 19/46 |
| 11,146,871 | B2 | 10/2021 | Sunshine et al. | |
| 11,164,917 | B1 | 11/2021 | Wang et al. | |
| 11,255,531 | B2 * | 2/2022 | Schorr, III | A41D 1/002 |
| 11,262,064 | B1 * | 3/2022 | Boyd | F21V 33/0008 |
| 11,350,860 | B1 * | 6/2022 | Wong | A61B 5/681 |
| 11,478,158 | B2 * | 10/2022 | Connor | A61B 5/14532 |
| 11,517,634 | B2 * | 12/2022 | Fulbrook | A61L 2/26 |
| 11,802,680 | B2 * | 10/2023 | Kearns | F21L 4/00 |
| 12,093,088 | B2 * | 9/2024 | Hiemstra | G06F 1/163 |
| 2006/0198120 | A1 * | 9/2006 | Guzman | A44C 15/0015 362/103 |
| 2008/0266112 | A1 * | 10/2008 | van de Sluis | G06F 3/04883 348/14.08 |
| 2009/0265971 | A1 * | 10/2009 | Cook | G09F 3/005 224/267 |
| 2011/0182057 | A1 * | 7/2011 | Watson | F21V 21/0816 362/103 |
| 2011/0310592 | A1 * | 12/2011 | Smith | F21V 21/0816 362/103 |
| 2012/0082012 | A1 * | 4/2012 | Blanckaert | G04B 37/225 368/227 |
| 2013/0170158 | A1 * | 7/2013 | Van Abeelen | H05K 1/0283 174/254 |
| 2014/0200423 | A1 * | 7/2014 | Eisen | A61B 5/7278 600/340 |
| 2015/0169011 | A1 * | 6/2015 | Bibl | H01L 33/44 345/175 |
| 2015/0258431 | A1 * | 9/2015 | Stafford | G06F 3/014 463/31 |
| 2016/0109953 | A1 * | 4/2016 | Desh | G06F 3/011 345/169 |
| 2016/0129279 | A1 * | 5/2016 | Ferolito | A61N 5/0616 607/94 |
| 2016/0154170 | A1 | 6/2016 | Thompson et al. | |
| 2016/0351838 | A1 * | 12/2016 | Momma | H10K 50/84 |
| 2017/0085688 | A1 * | 3/2017 | Zhou | H04B 5/77 |
| 2017/0164878 | A1 * | 6/2017 | Connor | G09B 19/00 |
| 2017/0235341 | A1 * | 8/2017 | Huitema | G04G 17/08 361/679.03 |
| 2017/0303646 | A1 * | 10/2017 | Bricken | G06F 1/1694 |
| 2017/0343888 | A1 * | 11/2017 | Raskin | G03B 15/02 |
| 2017/0364156 | A1 * | 12/2017 | Kim | G06F 1/163 |
| 2018/0000205 | A1 * | 1/2018 | Chinowsky | G06F 3/0346 |
| 2018/0020193 | A1 * | 1/2018 | Blum | G03B 17/561 |
| 2018/0042513 | A1 * | 2/2018 | Connor | A61B 5/369 |
| 2018/0376561 | A1 * | 12/2018 | Pham | F21V 23/0471 |
| 2019/0045296 | A1 * | 2/2019 | Ralph | H04R 1/2807 |
| 2019/0098969 | A1 * | 4/2019 | Gibson | F21V 33/0008 |
| 2019/0099613 | A1 * | 4/2019 | Estes | A61N 5/0616 |
| 2019/0116942 | A1 * | 4/2019 | Allan | B26B 19/3826 |
| 2019/0144062 | A1 * | 5/2019 | Poole | B62J 45/412 340/432 |
| 2019/0290138 | A1 * | 9/2019 | Yang | A61B 5/6826 |
| 2019/0298265 | A1 * | 10/2019 | Keating | A61B 5/02444 |
| 2019/0304265 | A1 * | 10/2019 | Guercio | F21V 23/04 |
| 2020/0000345 | A1 * | 1/2020 | Connor | A61B 5/6826 |
| 2020/0146625 | A1 * | 5/2020 | Nousiainen | A61B 5/681 |
| 2022/0034490 | A1 * | 2/2022 | Kearns | F21V 23/06 |
| 2022/0262481 | A1 | 8/2022 | Weast et al. | |
| 2022/0313847 | A1 * | 10/2022 | Fulbrook | A61L 2/24 |

\* cited by examiner

ELECTRONIC DEVICES WITH EDGE ILLUMINATORS

This application claims the benefit of provisional patent application No. 63/292,913, filed Dec. 22, 2021, which is hereby incorporated by reference herein in its entirety.

FIELD

This relates generally to electronic devices, and, more particularly, to electronic devices with visual output devices.

BACKGROUND

Electronic devices often include visual output devices. For example, a wrist-watch may include a display for providing visual output to a user. Touch-sensitive displays may be used in gathering user input.

It can be challenging to incorporate visual output devices into electronic devices. In some scenarios, displays may be too bulky to incorporate into wearable devices without sacrificing comfort. In other scenarios, displays may convey too much information and may be a distraction for the user.

SUMMARY

An electronic device may have an edge illuminator that forms a one-dimensional display. The edge illuminator may form a closed loop, may be straight, curved, segmented, or continuous, may be integrated into fabric, may be integrated into a speaker housing, may be integrated into a wearable band, a wearable device, a piece of clothing, a pair of shoes, a yoga mat or other fitness equipment, and/or an accessory such as a purse or bag, an electronic device case or cover, a pair of headphones, or other accessory, and/or may form part of any other suitable item. The edge illuminator may be mounted on a front edge of a device, a side edge of a device, a rear edge of a device, and/or any other suitable edge of a device. The edge illuminator may include a one-dimensional array of pixels formed from light-emitting diodes or other light-emitting devices. The edge illuminator may provide illumination to the border area of a device. The illumination may serve as low-resolution visual output for conveying certain information to a user without providing so much information that the user is distracted or otherwise interrupted from a present task.

The edge illuminator may form a secondary display that is coordinated with a primary display. The primary and secondary displays may form part of the same electronic device (e.g., may share a common housing) or may form part of two different electronic devices. The primary display may include a two-dimensional array of pixels. The visual content on the primary display may be synchronized with visual content on the secondary display.

The electronic device may be a wrist band that includes a strip of fabric that wraps around a longitudinal axis. Light sources such as a one-dimensional array of light-emitting diodes may be embedded in the strip of fabric and may emit light parallel to the longitudinal axis to produce edge illumination along an edge of the strip of fabric. The strip of fabric may include first and second fabric portions and the light sources may be interposed between the first and second fabric portions. The light sources may be located in the center of the strip of fabric, may be located in side pockets at the edge of the fabric, and/or may be in any other suitable location in the fabric. Arrangements in which the light sources form all or part of the edge of the fabric may also be used.

Optical structures such as light-diffusing strands, light-diffusing polymer structures, and/or light guides may be located between the light sources and the edge of the strip of fabric to help diffuse light and/or guide light to the edge of the strip of fabric. Light-reflecting layers may be formed on inner surfaces of the first and second fabric portions.

Control circuitry may control the light sources to produce the edge illumination in response to an event occurring on an external electronic device such as a notification on an external display. The colors of the edge illumination may match colors associated with the notification on the external display.

DETAILED DESCRIPTION

An electronic device may have an edge illuminator that forms a one-dimensional display. The edge illuminator may form a closed loop, may be straight, curved, segmented, or continuous, may be integrated into fabric, may be integrated into a speaker housing, may be integrated into a wearable band, a wearable device, a piece of clothing, a pair of shoes, a yoga mat or other fitness equipment, and/or an accessory such as a purse or bag, an electronic device case or cover, a pair of headphones, or other accessory, and/or may form part of any other suitable item. The edge illuminator may be mounted on a front edge of a device, a side edge of a device, a rear edge of a device, and/or any other suitable edge of a device. The edge illuminator may include a one-dimensional array of pixels formed from light-emitting diodes or other light-emitting devices. The edge illuminator may provide illumination to the border area of a device. The illumination may serve as low-resolution visual output for conveying certain information to a user without providing so much information that the user is distracted or otherwise interrupted from a present task. The edge illuminator may include light-blocking layers, light-reflecting layers, light-diffusing layers, light-guiding layers, and/or other layers to produce illumination in the desired location with the desired set of characteristics.

Figure 1:
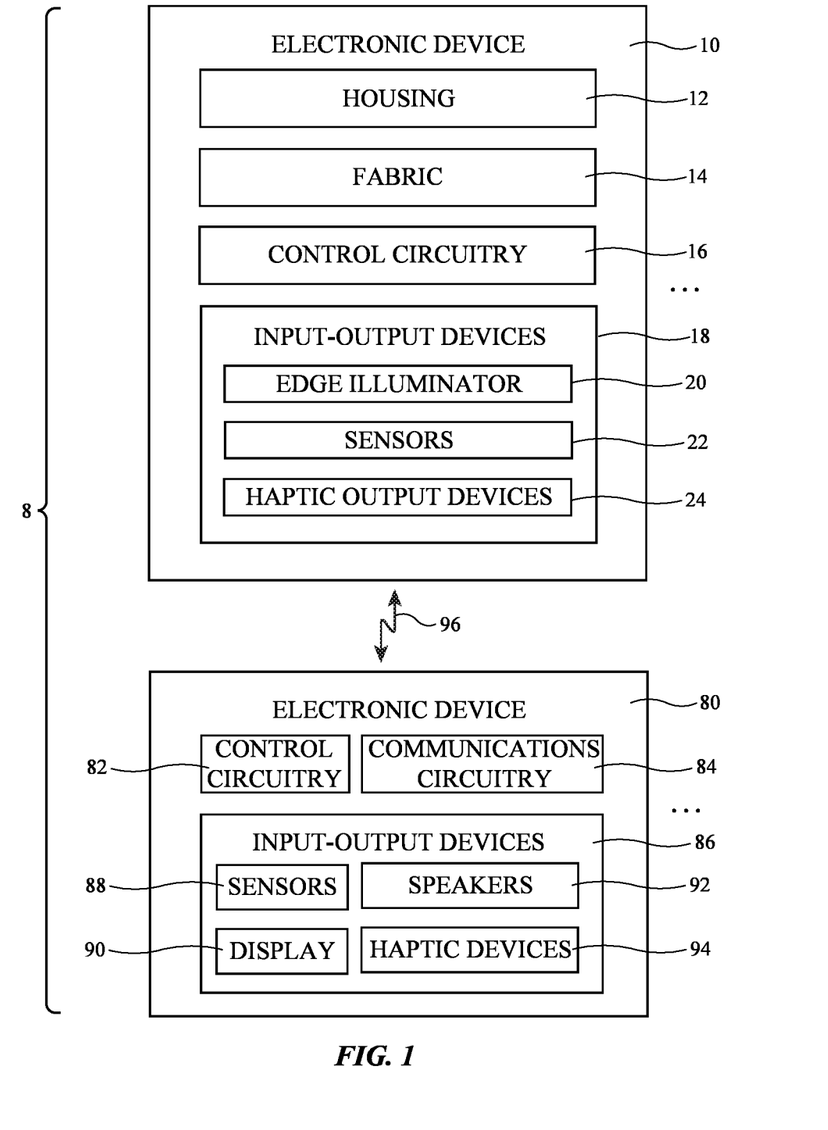
FIG. 1 is a schematic diagram of an illustrative system having one or more electronic devices with an edge illuminator in accordance with an embodiment.

An illustrative system that may include one or more electronic devices with an edge illuminator is shown in FIG. 1. As shown in FIG. 1, system 8 may include one or more electronic devices such as electronic device 10 and electronic device 80. Electronic device 10 may be a wearable device that is worn on a person's body (e.g., a person's wrist, arm, finger, arm, neck, waist, ankle, or other suitable body part) or clothing. Devices 10 may send device data to, receive control signals from, and/or otherwise communicate with electronic devices 80.

Electronic device 10 may be a computing device such as a laptop computer, a computer monitor containing an embedded computer (e.g., a desktop computer formed from a display with a desktop stand that has computer components embedded in the same housing as the display), a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, a tower computer, an embedded system such as a system in which electronic equipment with a display is mounted in a kiosk or automobile, equipment that implements the functionality of two or more of these devices, or other electronic equipment.

As shown in FIG. 1, electronic device 10 may include a housing such as housing 12. Housing 12 may have the shape of a wearable item such as a wrist band, a wrist watch, an arm band, a finger-mounted device, a waist band, a shirt or other clothing item, or other wearable, or housing 12 may have a non-wearable electronic device shape such as a cylindrical shape with rounded upper and lower ends, a box shape such as a rectangular box shape, a pyramidal shape, a conical shape, a spherical shape, and/or any other suitable shape. Housing 12 may include support structures formed from fabric, leather, metal, polymer, ceramic, glass, wood, other materials, and/or combinations of these materials. The shape of housing 12 may be selected to form an enclosure suited to the type of electronic device 10 for which the housing is being used. As an example, in scenarios in which electronic device 10 is a voice-controlled electronic device, housing 12 may be spherical, cylindrical, pyramidal, box-shaped, conical, or other shapes suitable for enclosing one or more speakers; in configurations in which electronic device 10 is a laptop computer, housing 12 may have upper and lower rectangular housing portions that are joined with a hinge and that can respectively house a display and a keyboard; in configurations in which electronic device 10 is a computer monitor containing an embedded computer, housing 12 may have a slender box shape with optionally curved rear housing walls that can hold a display and be mounted on a stand; in configurations in which electronic device 10 is a tablet computer, cellular telephone, media player, or other handheld or portable electronic device, housing 12 may have a rectangular outline and a thin depth; in configurations in which electronic device 10 is a smaller device such as a wristwatch device or a pendant device, housing 12 may have a thin profile and an outline that is rectangular, square, hexagonal, triangular, oval, or circular; in configurations in which electronic device 10 is a headphone or earpiece device, housing 12 may have a shape configured to fit on or in a user's ear; in configurations in which electronic device 10 is a pair of eyeglasses or other equipment worn on a user's head, housing 12 may have a head-mountable shape; in configurations in which electronic device 10 is an item of clothing or other wearable item (e.g., a hat, belt, wrist band, headband, shirt, pants, shoes, etc.), housing 12 may be formed from one or more layers of fabric or other material configured to allow electronic device 10 to be worn on a user's body; in configurations in which electronic device 10 is a television, a computer display that does not contain an embedded computer, a gaming device, or a navigation device, housing 12 may have a rectangular outline, an outline with curved sides and/or straight sides, a box shape, a cylindrical shape, and/or other suitable shapes; in configurations in which electronic device 10 is a kiosk, housing 12 can form a pedestal or other shape suitable for a kiosk; in configurations in which electronic device 10 forms part of an automobile, airplane, or other vehicle, housing 12 may form a dashboard, console, door, window, seat, body panel, or other portion of the vehicle; in configurations in which electronic device 10 is a removable external case for electronic equipment, housing 12 may have the shape of a sleeve or other structure with a recess for receiving the electronic equipment; in configurations in which electronic device 10 is a strap, wrist band, necklace or headband, housing 12 may have a strip shape with one or more layers of fabric or other material; in configurations in which electronic device 10 forms a case, bag, or wallet, housing 12 may have surfaces that form the walls of the case and/or sides of the bag or wallet and/or that form straps and/or other structures for the case or bag; and in configurations in which electronic device 10 is part of furniture, housing 12 may be configured to form a part of a chair, sofa, or other seating (e.g., cushions or other seating structures). Configurations in which housing 12 has a strip shape for forming a wearable band or a cylindrical shape for forming a voice-controlled speaker are sometimes described herein as illustrative examples.

Electronic device 10 may include fabric 14. Fabric 14 may form all or part of a housing wall or other layer, may form an outermost layer, may form one or more inner covering layers, may form internal structures, and/or may form other fabric-based structures. Electronic device 10 may be soft (e.g., electronic device 10 may have a fabric surface that yields to a light touch), may have a rigid feel (e.g., the surface of electronic device 10 may be formed from a stiff fabric), may be coarse, may be smooth, may have ribs or other patterned textures, and/or may be formed as part of a device that has portions formed from non-fabric structures of plastic, metal, glass, crystalline materials, ceramics, or other materials. In an illustrative configuration, fabric 14 forms a strip that can be worn around a user's wrist or other body part. In another illustrative configuration, fabric 14 serves as a cosmetic cover for electronic device 10 that overlaps audio components (microphones and/or speakers).

Electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc. Control circuitry 16 may include wired and/or wireless communications circuitry (e.g., antennas and associated radio-frequency transceiver circuitry such as cellular telephone communications circuitry, wireless local area network communications circuitry, etc.). The communications circuitry of control circuitry 16 may allow device 10 to communicate with keyboards, computer mice, remote controls, speakers, accessory displays, accessory cameras, and/or other electronic devices that serve as accessories for device 10.

Input-output circuitry in device 10 such as input-output devices 18 may be used to allow data to be supplied to device 10 and to allow data to be provided from device 10 to external devices. Input-output devices 18 may include input devices that gather user input and other input and may include output devices that supply visual output, audible output, or other output. These devices may include buttons, joysticks, scrolling wheels, touch pads, key pads, keyboards, microphones, speakers, tone generators, vibrators and other haptic output devices, light-emitting diodes and other status indicators, data ports, etc.

Input-output devices 18 may include one or more illumination structures such as edge illuminator 20. Edge illumination structures such as edge illuminator 20 may be formed in suitable locations within device 10 such as along one or more portions of the peripheral edge of housing 12 and/or fabric 14. Edge illuminator 20 may include one or more light-emitting diodes (e.g., organic light-emitting diodes and/or crystalline semiconductor light-emitting diodes), one or more lasers (e.g., laser diodes), one or more individually adjustable components that adjust light transmission and/or reflection and that are illuminated by a backlight or by ambient light (e.g., a liquid crystal display structure such as one or more liquid crystal light modulator cells or an array of such cells, an electronic ink display structure sometimes referred to as an electrophoretic display structure such as one or more electrophoretic cells or an array of such cells), and/or other electrically adjustable light-emitting and/or light modulating components. Illustrative configurations in which edge illuminator 20 includes one or more light-emitting components such as one or more light-emitting diodes may sometimes be described herein as an example. In general, any suitable light-emitting and/or light modulating components may be formed in edge illuminator 20, if desired. Edge illuminators may have ring shapes that extend around the entire border of a strip of fabric or housing structure. If desired, there may be two or more edge illuminators 20 in device 10 (e.g., a first illuminator 20 on a first edge of device 10 and a separate a second illuminator on a second edge of device 10, etc.). Such illuminators may be controlled in coordination with each other and/or may be individually controlled.

Edge illuminator 20 may include a single light-emitting component, two light-emitting components, 2-100 light-emitting components, at least 20 light-emitting components, fewer than 2000 light-emitting components, fewer than 400 light-emitting components, fewer than 100 light-emitting components, fewer than 40 light-emitting components, fewer than 25 light-emitting components, fewer than ten light-emitting components, or other suitable number of individually or collectively controllable light-emitting components. These light-emitting components may be used to emit light of any suitable color (white, a non-neutral color such as red, green, blue, etc.). In some arrangements, edge illuminator 20 may include one or more light guides, diffusers, reflectors, light-absorbing layers, and/or other structures for distributing light from one or more light-emitting components to desired locations (e.g., locations along the border of display 14). If desired, edge illuminator 20 may include a one-dimensional array or a two-dimensional array of light-emitting components (e.g., light-emitting diode pixels). Edge illuminator 20 may include a large number or light-emitting diodes or may contain only a single light-emitting diode or other small number of light-emitting diodes or other light-emitting components (e.g., so that edge illuminator 20 may emit diffuse illumination of a single color and/or may emit other illumination from a single component or other small number of light-emitting components). Light sources in edge illuminator 20 such as light-emitting diodes may form discrete regions of illumination separated by gaps and/or may form a continuous strip of illumination without visible gaps. If desired, the light emitted by illuminator 20 may be used to display visual content (e.g., using colors, time variations, and/or spatial patterns).

If desired, device 10 may include other illumination devices such as a display (e.g., an organic light-emitting diode display with an array of thin-film organic light-emitting diode pixels, a liquid crystal display with an array of liquid crystal display pixels and an optional backlight unit, a display having an array of pixels formed from respective crystalline light-emitting diodes each of which has a respective crystalline semiconductor light-emitting diode die, and/or other display). Arrangements in which device 10 includes edge illuminator 20 without including a display are sometimes described herein as an example.

If desired, edge illuminator 20 may provide light that matches or compliments the color of content on the display of a separate, external electronic device (e.g., a cellular telephone, laptop computer, tablet computer, wrist watch device, head-mounted device, and/or other electronic device belonging to the user wearing device 10), may provide light that has different colors, intensities, etc. in different areas, may provide static light, may provide light that flashes on and off and/or that otherwise varies in intensity and/or color as a function of time, may provide solid regions of color, may include text, graphics, icons, moving images, and other visual output. In some arrangements, visual output from edge illuminator 20 may be associated with image content (e.g., virtual reality content, augmented reality content, and/or mixed reality content) being displayed on a head-mounted device that is also worn by the user wearing device 10. The edge illumination may be used to convey information to people that are near the user wearing the head-mounted device (e.g., information about what content the user is watching on the head-mounted device and/or other information). To conserve power and reduce complexity and to incorporate edge illuminator 20 into portions of device 10 with curved surfaces, edge illuminator 20 may, if desired, be provided with less spatial resolution than the pixels of a display on a separate electronic device.

Edge illuminator 20 may be used to display content such as diffuse light, patterns of diffuse light, text, icons, still and/or moving images, low-resolution images, and/or other content. Diffuse light and/or other lower-resolution content may be displayed in coordination with the content on the display of a separate external electronic device such as a cellular telephone, laptop computer, tablet computer, wrist watch device, head-mounted device, television, and/or other suitable electronic device belonging to the user wearing device 10. For example, in an example in which edge illuminator 20 has a single solid color that extends in an unbroken ring around device 10, this color may be selected to match the average color of the image on an external display, may be selected to match the average intensity of the image on an external display, may have a different color and/or intensity that coordinates with the attributes of the image on an external display, and/or may have a fixed intensity and/or color that is displayed whenever content is displayed on an external display. In arrangements in which edge illuminator 20 has multiple individually adjustable areas, these areas may be adjusted to match the intensities, colors, and/or patterns of images on an external display and/or may be adjusted to create text, icons, and/or other patterns of visual content.

If desired, the colors, intensity, and pattern of illumination from edge illuminator 20 may be selected based on a notification that is displayed on an external display. For example, notifications on an external display may be associated with certain applications such as messaging applications, timer applications, email applications, music applications, voice-controlled assistant notifications, social media applications, etc. Each application and/or each notification may be represented using an icon on the external display. When such a notification is received on the external electronic device, edge illuminator 20 may provide illumination having colors and/or patterns that match the icon associated with the notification (e.g., edge illuminator 20 may display green and white colors when a messaging notification with a green and white icon is displayed on an external display).

Edge illuminator 20 may also produce illumination that may or may not be associated with content on an external display, such as illumination associated with fitness tracking, heart rate monitoring, sleep tracking, etc.

Input-output devices 18 may also include sensors 22. Sensors 22 may include force sensors (e.g., strain gauges, capacitive force sensors, resistive force sensors, etc.), audio sensors such as microphones, touch and/or proximity sensors such as capacitive sensors (e.g., a one-dimensional or two-dimensional capacitive touch sensor integrated into edge illuminator 20 and/or a touch sensor that forms a button, trackpad, or other input device not associated with edge illuminator 20), and other sensors. If desired, sensors 22 may include optical sensors such as optical sensors that emit and detect light, ultrasonic sensors, optical touch sensors, optical proximity sensors, and/or other touch sensors and/or proximity sensors, monochromatic and color ambient light sensors, image sensors, fingerprint sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors (e.g., sensors that gather position information, three-dimensional radio-frequency images, and/or other information using radar principals or other radio-frequency sensing), depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, gaze tracking sensors, three-dimensional sensors (e.g., pairs of two-dimensional image sensors that gather three-dimensional images using binocular vision, three-dimensional structured light sensors that emit an array of infrared light beams or other structured light using arrays of lasers or other light emitters and associated optical components and that capture images of the spots created as the beams illuminate target objects, and/or other three-dimensional image sensors), facial recognition sensors based on three-dimensional image sensors, and/or other sensors. In some arrangements, device 10 may use sensors 22 and/or other input-output devices to gather user input (e.g., buttons may be used to gather button press input, touch sensors overlapping displays can be used for gathering user touch screen input, touch pads may be used in gathering touch input, microphones may be used for gathering audio input, etc.). If desired, sensors in device 10 such as motion sensors (e.g., accelerometer, gyroscope, etc.), optical heart rates sensors, and/or other sensors may be used to gather user input by detecting hand gestures such as hand clenching, double-clenching (e.g., two first clenching gestures spaced closely in time), hand waving, finger movements, etc.

If desired, sensors 22 may include tension sensors (e.g., strain gauges, load cells, and/or other tension sensors) that can detect an amount of tension in device 10 (e.g., an amount of tension in fabric 14). Tension sensors in device 10 may be used to detect when device 10 is being worn. For example, if tension in fabric 14 is above a given threshold, control circuitry 16 may determine that device 10 is being worn around the user's wrist or other body part. When tension in fabric 14 is below the given threshold, control circuitry 16 may determine that device 10 is not being worn. Control circuitry 16 may operate device 10 in a first mode when the tension sensor indicates that device 10 is being worn and may operate device 10 in a second mode when the tension sensor indicates that device 10 is not being worn. For example, control circuitry 16 may use different types of output to provide notifications to the user based on whether device 10 is being worn or not (e.g., haptic and visual output when device 10 is being worn versus only visual output when device 10 is not being worn).

If desired, electronic device 10 may include additional components such as other devices in input-output devices 18. The additional components may include haptic output devices 24 (e.g., piezoelectric haptic actuators, haptic actuators based on electroactive polymer devices, electromechanical actuators, and/or other haptic output devices that provide a user with tactile output such as vibrations, impulses, etc.), audio output devices such as a speaker, audio input devices such as a microphone, light sources such as light-emitting diodes (e.g., crystalline semiconductor light-emitting diodes for status indicators and/or components), other optical output devices, and/or other circuitry for gathering input and/or providing output. Device 10 may also include an optional battery or other energy storage device, connector ports for supporting wired communications with ancillary equipment and for receiving wired power, and other circuitry. Device 10 may be operated in systems that include wired and/or wireless accessories (e.g., keyboards, computer mice, remote controls, trackpads, etc.).

If desired, a user may wear multiple devices 10. Each device 10 may have different functionality than the other devices 10 (e.g., one device 10 may be used for fitness applications and another device 10 may be used for gaming applications), or devices 10 may have the same functionality. Multiple devices 10 may be worn on the same wrist, may be worn on each of the user's wrists, may be worn on one or more fingers, may be worn on the wrist and the fingers of one arm, and/or may be worn on other parts of the body. The devices 10 may be paired with one another or may operate unpaired. If desired, visual and/or haptic output from multiple devices 10 may be coordinated for a combined effect.

Additional electronic devices in system 8 such as devices 80 may include devices such as a laptop computer, a computer monitor containing an embedded computer, a tablet computer, a desktop computer, a cellular telephone, a media player, or other handheld or portable electronic device, a smaller device such as a wristwatch device, a pendant device, a headphone or earpiece device, a head-mounted device such as glasses, goggles, a helmet, or other equipment worn on a user's head, or other wearable or miniature device, a television, a computer display that does not contain an embedded computer, a gaming device, a remote control, a navigation device, an embedded system such as a system in which equipment is mounted in a kiosk, in an automobile, airplane, or other vehicle, a removable external case for electronic equipment, a strap, a wrist band or head band, a removable cover for a device, a case or bag that has straps or that has other structures to receive and carry electronic equipment and other items, a necklace or arm band, a wallet, sleeve, pocket, or other structure into which electronic equipment or other items may be inserted, part of a chair, sofa, or other seating (e.g., cushions or other seating structures), part of an item of clothing or other wearable item (e.g., a hat, belt, wrist band, headband, sock, glove, shirt, pants, etc.), or equipment that implements the functionality of two or more of these devices. If desired, device 80 and device 10 may share a common housing.

Electronic device 80 of system 8 may include control circuitry 82. Control circuitry 82 may include storage and processing circuitry for supporting the operation of device 80 and/or system 8. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 82 may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc.

Electronic device 80 may include input-output devices 86. Input-output devices 86 may be used in gathering user input, in gathering information on the environment surrounding device 80, and/or in providing a user with output. Devices 86 may include sensors 88. Sensors 88 may include force sensors (e.g., strain gauges, capacitive force sensors, resistive force sensors, etc.), audio sensors such as microphones, touch and/or proximity sensors such as capacitive sensors, optical sensors such as optical sensors that emit and detect light, ultrasonic sensors, and/or other touch sensors and/or proximity sensors, monochromatic and color ambient light sensors, image sensors, sensors for detecting position, orientation, and/or motion (e.g., accelerometers, magnetic sensors such as compass sensors, gyroscopes, and/or inertial measurement units that contain some or all of these sensors), muscle activity sensors (EMG), radio-frequency sensors, depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, and/or other sensors. In some arrangements, device 80 may use sensors 88 and/or other input-output devices 86 to gather user input (e.g., buttons may be used to gather button press input, touch sensors overlapping displays can be used for gathering user touch screen input, touch pads may be used in gathering touch input, microphones may be used for gathering audio input, accelerometers may be used in monitoring when a finger contacts an input surface and may therefore be used to gather finger press input, etc.).

Device 80 may include haptic output devices 94. Haptic output devices 94 may include actuators such as electromagnetic actuators, motors, piezoelectric actuators, electroactive polymer actuators, vibrators, linear actuators, rotational actuators, actuators that bend bendable members, actuator devices that create and/or control repulsive and/or attractive forces between devices 10 and/or 80 (e.g., components for creating electrostatic repulsion and/or attraction such as electrodes, components for producing ultrasonic output such as ultrasonic transducers, components for producing magnetic interactions such as electromagnets for producing direct-current and/or alternating-current magnetic fields, permanent magnets, magnetic materials such as iron or ferrite, and/or other circuitry for producing repulsive and/or attractive forces between devices 10 and/or 80). In some situations, actuators for creating forces in device 80 may be used in producing tactile output (e.g., vibrations on the user's skin or that can be heard from a distance). In other situations, these components may be used to interact with each other (e.g., by creating a dynamically adjustable electromagnetic repulsion and/or attraction force between a pair of devices 80 and/or between devices 10 and device 80 using electromagnets).

If desired, input-output devices 86 of device 80 may include other devices such as display 90 (e.g., to display images for a user), status indicator lights (e.g., a light-emitting diode that serves as a power indicator, and other light-based output devices), speakers 92 and other audio output devices, electromagnets, permanent magnets, structures formed from magnetic material (e.g., iron bars or other ferromagnetic members that are attracted to magnets such as electromagnets and/or permanent magnets), batteries, etc. Device 80 may also include power transmitting and/or receiving circuits configured to transmit and/or receive wired and/or wireless power signals.

To support communications between devices 10 and device 80 and/or to support communications between equipment in system 8 and external electronic equipment, control circuitry 82 may communicate using communications circuitry 84. Circuitry 84 may include antennas, radio-frequency transceiver circuitry, and other wireless communications circuitry and/or wired communications circuitry. Circuitry 84, which may sometimes be referred to as control circuitry and/or control and communications circuitry, may, for example, support bidirectional wireless communications between devices 10 and 80 using wireless signals 96 (e.g., wireless local area network signals, near-field communications signals, Bluetooth® signals, 60 GHz signals or other millimeter wave signals, ultra-wideband communications signals, etc.). Device 80 may also include power circuits for transmitting and/or receiving wired and/or wireless power and may include batteries. In configurations in which wireless power transfer is supported between devices 10 and device 80, in-band wireless communications may be supported using inductive power transfer coils (as an example).

Wireless signals 96 may be used to convey information such as location and orientation information. For example, control circuitry 82 in device 80 may determine the location of device 10 using wireless signals 96 and/or control circuitry 16 in device 10 may determine the location of device 80 using wireless signals 96. In one illustrative arrangement, device 10 may include a low-power transmitter (e.g., a Bluetooth® Low Energy transmitter, an ultra-wideband radio frequency signal transmitter, an RFID transmitter, a near-field communications transmitter, and/or other transmitter). Device 80 may have a corresponding receiver that detects the transmitted signals 96 from device 10 and determines the location of device 10 based on the received signals.

Device 80 may track the location (e.g., the indoor or outdoor location) of device 10 using signal strength measurement schemes (e.g., measuring the signal strength of radio signals from device 10) and/or using time-based measurement schemes such as time of flight measurement techniques, time difference of arrival measurement techniques, angle of arrival measurement techniques, triangulation methods, time-of-flight methods, using a crowdsourced location database, and other suitable measurement techniques. This type of location tracking may be achieved using ultra-wideband signals, Bluetooth® signals, WiFi® signals, millimeter wave signals, and/or other suitable signals. This is merely illustrative, however. If desired, control circuitry 82 of device 80 may determine the location of device 10 using Global Positioning System receiver circuitry, using proximity sensors (e.g., infrared proximity sensors or other proximity sensors), depth sensors (e.g., structured light depth sensors that emit beams of light in a grid, a random dot array, or other pattern, and that have image sensors that generate depth maps based on the resulting spots of light produced on target objects), sensors that gather three-dimensional depth information using a pair of stereoscopic image sensors, lidar (light detection and ranging) sensors, radar sensors, using image data from a camera, using motion sensor data, and/or using other circuitry in device 80.

If desired, angle of arrival measurement techniques may be employed by control circuitry 16 of device 10 and/or control circuitry 82 of device 80 to determine the relative orientation of device 10 and device 80. For example, control circuitry 82 may determine the orientation of device 80 relative to device 10 by determining a phase difference associated with signals 96 received by antennas in device 80 from device 10. The phase difference may be used to determine an angle of arrival of signals 96 from device 10 received by device 80. Similarly, control circuitry 16 of device 10 may, if desired, determine the orientation of device 10 relative to device 80 by determining a phase difference associated with signals 96 received by antennas in device 10 from device 80. The phase difference may be used to determine an angle of arrival of signals 96 from device 80 received by device 10.

To keep device 10 relatively small, lightweight, and low-power, device 10 may include a low-power signal transmitter (e.g., a Bluetooth® Low Energy transmitter, an ultra-wideband radio frequency signal transmitter, an RFID transmitter, a near-field communications transmitter, and/or other transmitter), but may not include a display or other electronics that might require a significant amount of space or power. This is merely illustrative, however. If desired, device 10 may include a display. Arrangements in which device 10 is a display-free wearable device that does not include a display are sometimes described herein as illustrative examples.

The one or more electronic devices 80 that communicate with devices 10 may sometimes be referred to as host devices or primary devices (devices 10 may sometimes be referred to as secondary devices). The host devices may run software that is used to track the location of devices 10, send control signals to devices 10, receive data from devices 10, and/or perform other functions related to the operation of devices 10.

Figure 2:
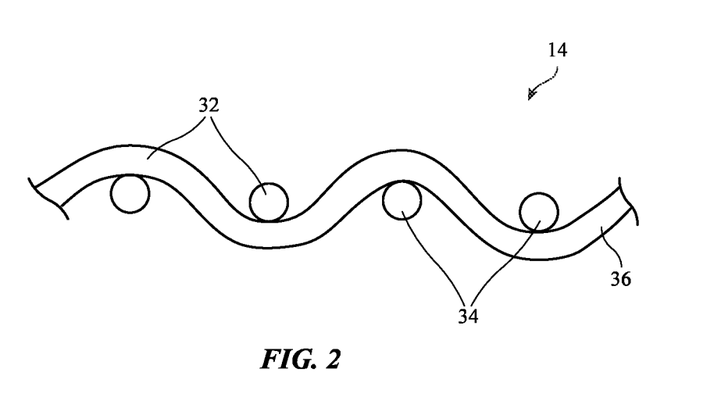
FIG. 2 is a side view of an illustrative fabric that may be used to form an edge illuminator in accordance with an embodiment.

FIG. 2 is a cross-sectional side view of an illustrative piece of fabric that may be included in device 10. Fabric 14 may include interlaced strands of material such as strands 32. Fabric 14 may include warp knit fabric, woven fabric, fabric with braided strands of material, and/or any other suitable type of fabric. Strands 32 may be single-filament strands (sometimes referred to as fibers or monofilaments) or may be strands of material formed by interlacing multiple monofilaments of material together (sometimes referred to as yarns).

Strands 32 may be formed from polymer, metal, glass, graphite, ceramic, natural materials such as cotton or bamboo, or other organic and/or inorganic materials and combinations of these materials. Conductive coatings such as metal coatings may be formed on non-conductive material. For example, plastic strands in fabric 14 may be coated with metal to make them conductive. Reflective coatings such as metal coatings may be applied to make strands reflective. Strands formed from white polymer (e.g., light-scattering particles in polymer) and/or that are coated with white polymer may help reflect light in some configurations. If desired, strands may be formed from bare metal wires or metal wire intertwined with insulating monofilaments (as examples). Bare metal strands and strands of polymer covered with conductive coatings may be provided with insulating polymer jackets. In some configuration, strands 32 may include optical fibers (e.g., lossy optical fibers with surface roughening or other features that allow the strands to guide light while emitting portion of the guided light outwardly). Optical waveguide strands (e.g., lossy optical fibers formed from glass, transparent polymer, etc.) can be provided with light from light sources such as light-emitting diodes to display information (e.g., desired patterns of light). In some cases, it may be desirable for lossy fiber to appear dark or colored in reflection when illuminated by external light, so that the lossy fiber may match the appearance of other fibers. In these cases, the lossy fiber can include regions that are colored on the outside of the fiber but only leak light slightly or not at all and other regions that emit light due to roughen of the fiber surface or localized adjustments to the cladding of the fiber in that region (e.g., localized cladding thinning).

In the example of FIG. 2, fabric 14 is a woven fabric, and strands 32 include warp strands 34 and weft strands 36. If desired, additional strands that are neither warp nor weft strands may be incorporated into fabric 14. Fabric 14 may be a single layer of fabric or may include multiple layers of fabric. Arrangements in which fabric 14 has a non-woven structure such as a warp knit structure, a weft knit structure, a circular knit structure, and/or any other suitable structure may also be used.

Figure 3:
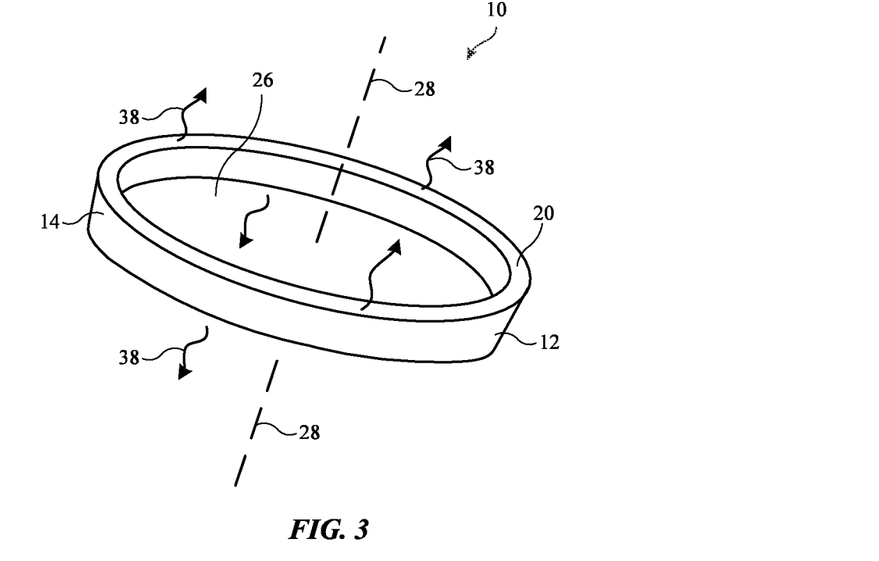
FIG. 3 is a perspective view of an illustrative electronic device such as a wearable electronic device having an edge illuminator that emits light parallel to a longitudinal axis in accordance with an embodiment.

FIG. 3 is a perspective view of device 10 in an illustrative configuration in which device 10 is a wearable item such as a band configured to be worn around part of a user's body such as the wrist. In this type of arrangement, housing 12 may include fabric 14 having a strip shape that extends partially or completely around a longitudinal axis such as longitudinal axis 28.

Housing 12 may be formed of plastic, glass, ceramics, fiber composites, metal (e.g., stainless steel, aluminum, metal links, interlinked chain links, etc.), elastomeric polymer (e.g., silicone and/or other stretchable plastics), fabric (e.g., fabric 14 of FIG. 1 and/or FIG. 2 such as woven fabric, knit fabric, braided fabric, fabric that includes stretchable strands of elastomeric material, etc.), other suitable materials (e.g., leather, wood, or other natural materials, crystalline materials, etc.), or a combination of any two or more of these materials. Arrangements in which housing 12 includes waterproof materials, water-resistant materials, and/or oil-resistant materials may also be used.

In the example of FIG. 3, one or more portions of housing 12 are formed from fabric 14 (e.g., stretchable or non-stretchable fabric). Fabric 14 of device 10 forms a loop-shaped strip surrounding an opening such as opening 26 that is configured to receive a body part of a user. If desired, device 10 may be formed using stretchable fabric that returns to its original shape after being stretched. The use of stretchable fabric in device 10 may ensure that device 10 is held against the user's body so that sensors (e.g., sensor electrodes) will be in close proximity to the user's skin and can gather measurements that might otherwise be difficult or impossible to gather (e.g., skin moisture measurements, EKG measurements, blood pressure measurements, etc.). This is, however, merely illustrative. If desired, device 10 may be formed using fabric that is not stretchable or may be formed without fabric.

Housing 12 may have any suitable cross-sectional shape. As examples, housing 12 may have a circular cross-sectional shape, a rectangular cross-sectional shape, a rectangular cross-sectional shape with rounded corners, an oval cross-sectional shape, or other suitable cross-sectional shape. Housing 12 may have curved outer surfaces, may have planar outer surface, may be flat, or may have a combination of these shapes.

Housing 12 may be formed from a single unitary piece of fabric 14 (e.g., a continuous loop without seams or a string having ends that attach to each other or that attach to another structure) or may be formed with first and second ends that can be joined by a clasp (e.g., a magnetic clasp, an electrical clasp, a mechanical clasp, etc.) or other attachment structure.

One or more edge portions of device 10 may be provided with light from an edge illuminator such as edge illuminator 20. In the example of FIG. 3, edge illuminator 20 emits light 38 in a direction parallel to longitudinal axis 28 (e.g., parallel the surface of the user's wrist in arrangements where device 10 is a wrist band). If desired, device 10 may include a first edge illuminator 20 along a first edge of housing 12 and a second edge illuminator 20 along a second opposing edge of housing 12. The two edge illuminators 20 may emit light 38 in opposite directions, parallel to longitudinal axis 28. Edge illuminators 20 may extend partially or completely around the loop-shaped housing 12 of device 10.

Figure 4:
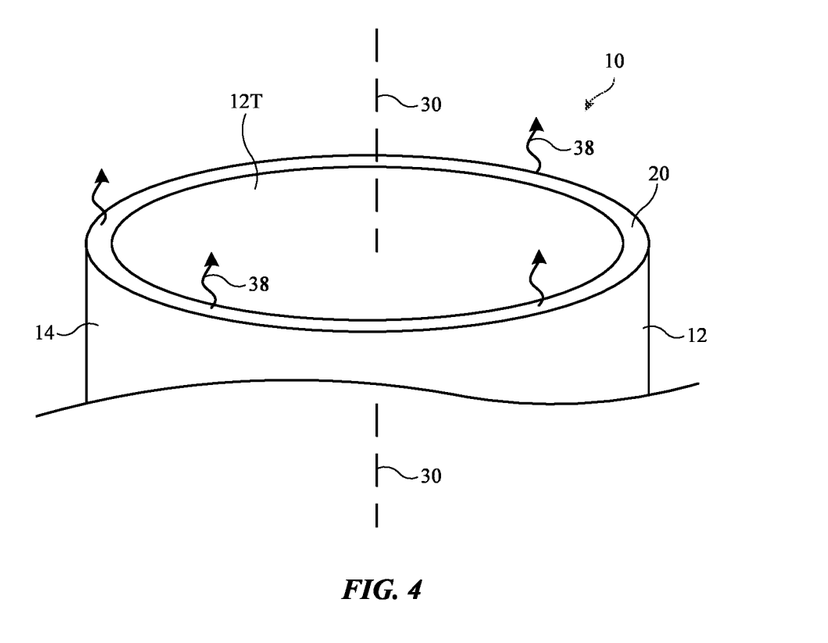
FIG. 4 is a perspective view of an illustrative electronic device such as a speaker having an edge illuminator that emits light parallel to a longitudinal axis in accordance with an embodiment.

FIG. 4 is a perspective view of device 10 in an illustrative configuration in which device 10 is a non-wearable electronic device such as a speaker or other suitable electronic device. In this type of arrangement, housing 12 may have a round shape (e.g., spherical, semi-spherical, cylindrical, etc.), a rectangular shape, and/or any other suitable shape. Housing 12 may extend partially or completely around a longitudinal axis such as longitudinal axis 30. Housing 12 may have a top surface 12T that is perpendicular to longitudinal axis 30.

Housing 12 may be formed using a unibody configuration in which some or all of housing 12 is machined or molded as a single structure or may be formed using multiple structures (e.g., an internal frame structure, one or more structures that form exterior housing surfaces, etc.).

In the example of FIG. 4, one or more portions of housing 12 are formed from fabric 14 (e.g., stretchable or non-stretchable fabric). Fabric 14 of device 10 may form an outer layer of device 10 and may partially or completely surround longitudinal axis 30. Housing 12 may have any suitable cross-sectional shape. As examples, housing 12 may have a circular cross-sectional shape, a rectangular cross-sectional shape, a rectangular cross-sectional shape with rounded corners, an oval cross-sectional shape, or other suitable cross-sectional shape. Housing 12 may have curved outer surfaces, may have planar outer surface, may be flat, or may have a combination of these shapes.

One or more edge portions of device 10 may be provided with light from an edge illuminator such as edge illuminator 20. In the example of FIG. 4, edge illuminator 20 emits light 38 in a direction parallel to longitudinal axis 30. If desired, device 10 may include a first edge illuminator 20 along a first edge of housing 12 and a second edge illuminator 20 along a second opposing edge of housing 12. The two edge illuminators 20 may emit light 38 in opposite directions, parallel to longitudinal axis 30. Edge illuminators 20 may extend partially or completely around longitudinal axis 30 of device 10.

Figure 5:
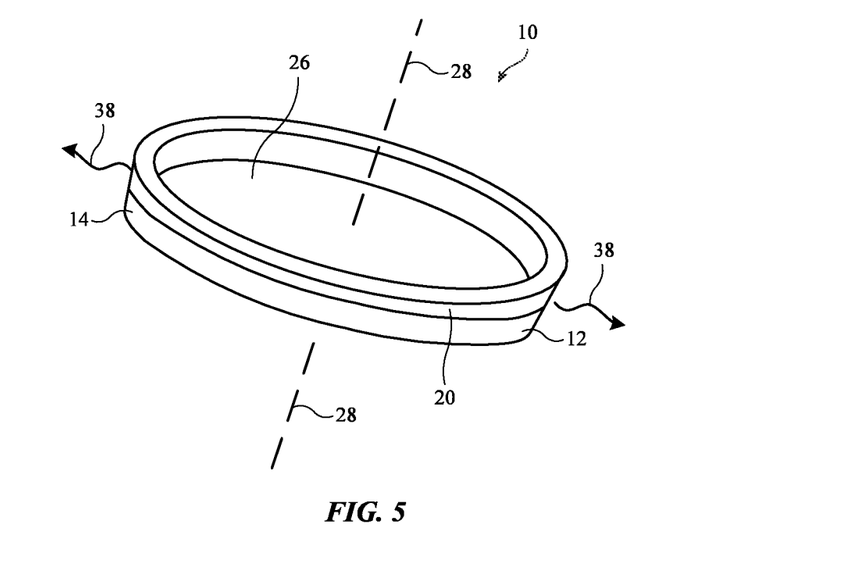
FIG. 5 is a perspective view of an illustrative electronic device such as a wearable electronic device having an edge illuminator that emits light perpendicular to a longitudinal axis in accordance with an embodiment.

FIG. 5 is a perspective view of device 10 in an illustrative configuration similar to that of FIG. 3 in which device 10 is a wearable item such as a band configured to be worn around part of a user's body such as the wrist. Housing 12 may be formed from fabric 14 and may extend partially or completely around longitudinal axis 28. Edge illuminator 20 may be formed at one or more edges of device 10 and may emit light 38 in a direction perpendicular to longitudinal axis 28 (e.g., away from the user's wrist in arrangements where device 10 is a wrist band).

Figure 6:
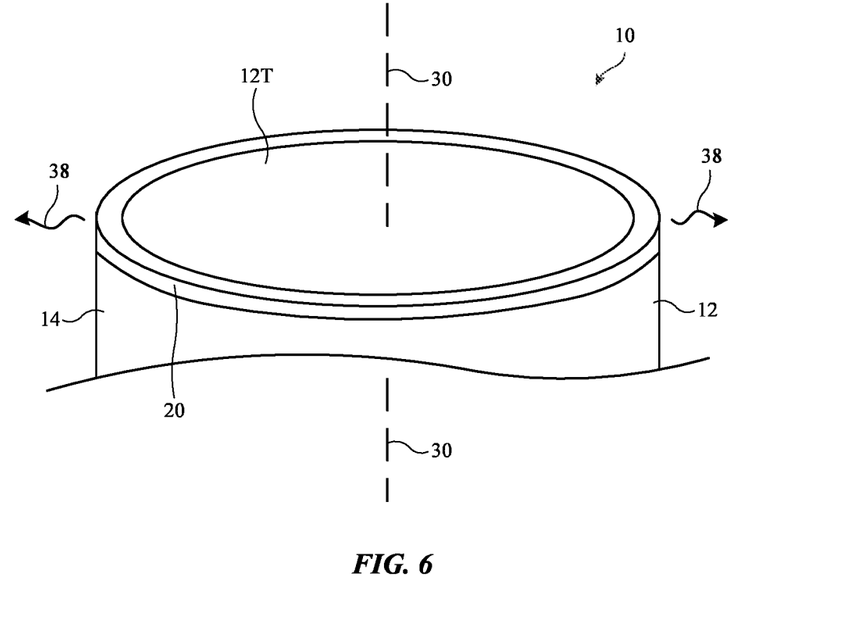
FIG. 6 is a perspective view of an illustrative electronic device such as a speaker having an edge illuminator that emits light perpendicular to a longitudinal axis in accordance with an embodiment.

FIG. 6 is a perspective view of device 10 in an illustrative configuration similar to that of FIG. 4 in which device 10 is a non-wearable electronic device such as a speaker or other suitable electronic device. Housing 12 may include one or more layers of fabric 14 and may extend partially or completely around longitudinal axis 30. Edge illuminator 20 may be formed at one or more edges of device 10 and may emit light 38 in a direction parallel to longitudinal axis 28 (e.g., away from device 10).

Figure 7:
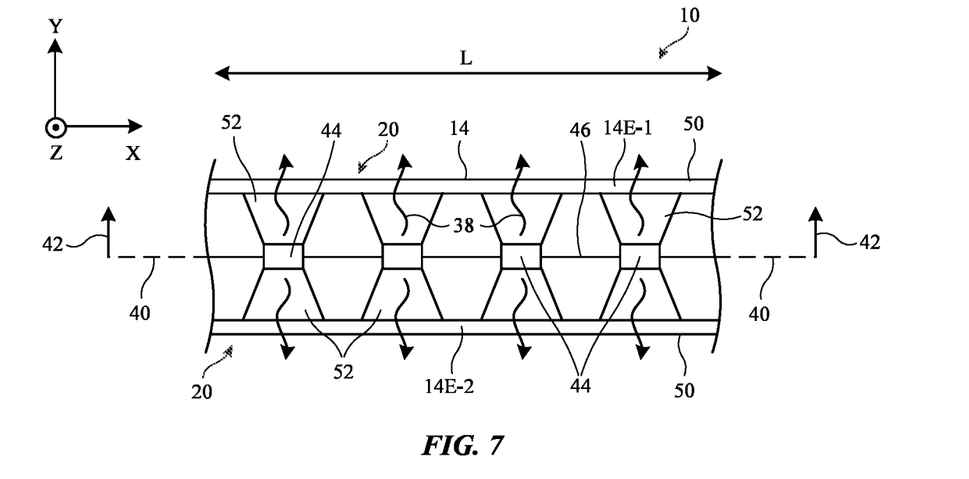
FIG. 7 is a top view of an illustrative wearable electronic device having an array of light sources embedded in a piece of fabric to form an edge illuminator in accordance with an embodiment.

FIG. 7 is a top view of an illustrative electronic device 10 having fabric with one or more edge illuminators. As shown in FIG. 7, device 10 may include a strip of fabric 14. Fabric 14 may include one or more fabric layers such as an upper fabric layer and a lower fabric layer stacked in the z-direction of FIG. 7 and extending along the x-y plane of FIG. 7. Edge illuminator 20 may include an array of light sources such as light sources 44 distributed along the length L of the strip of fabric 14. Light sources 44 may be light-emitting devices such as light-emitting diodes, lasers, etc. Illustrative configurations in which light-emitting diodes are used in providing illumination for edge illuminator 20 are sometimes described herein as an example. Light sources 44 may be mounted to a common printed circuit (e.g., a flexible printed circuit or other suitable printed circuit) or may be mounted to separate individual printed circuits (e.g., each light source 44 may be mounted to its own discrete printed circuit substrate). Control circuitry 16 may provide control signals to light sources 44 via one or more signal paths such as signal path 46. Signal path 46 may be one or more wires, one or more conductive strands 32, one or more traces on a printed circuit, and/or other suitable signal path structures. Light sources 44 may be individually addressable and independently controlled and/or may be controlled in unison and/or in blocks.

Light sources 44 may emit light in a single direction or in multiple directions. In the illustrative configuration of FIG. 7, light sources 44 emit light 38 in first and second opposing directions, perpendicular to the z-axis of FIG. 7. This allows light sources 44 to form a first edge illuminator 20 along a first edge 14E-1 of the strip of fabric 14 and a second edge illuminator 20 on a second edge 14E-2 of the strip of fabric 14. If desired, each light source 44 may include a first light-emitting diode that emits light towards edge 14E-1 and a second light-emitting diode that emits light towards edge 14E-2, or each light source 44 may include a single light-emitting diode that emits light in both directions towards edges 14E-1 and 14E-2.

If desired, light sources 44 may emit light through an optical structure such as optical structure 52. In one illustrative arrangement, optical structure 52 may be a light guide that helps guide light from light source 44 to edge 14E-1 or 14E-2. The light guide may be formed from a transparent polymer structure (e.g., a rigid polymer plate or a thin flexible light guide film), an optical fiber, a light guiding strand in fabric 32, and/or any other light guiding structure that guides light 38 to edges 14E-1 and 14E-2 in accordance with the principal of total internal reflection. The light guide may have curved surfaces and/or other desired three-dimensional shapes. Light-scattering features such as protrusions, recesses, and/or light-scattering particles in the light guide forming optical structure 52 may be used to help extract light 38 to form edge illumination. Optional reflective structures may be used to help recycle light that has scattered from the light guide in a direction away from the desired direction of light emission.

In another illustrative arrangement, optical structure 52 may be a diffuser that helps diffuse light 38 so that the illumination from edge illuminator 20 is continuous. Diffusers that may be used for optical structures 52 may include transparent members such as polymer or other transparent material with embedded light-scattering particles, fabric (e.g., strands 32 in fabric 14 that help diffuse light 38 as it travels towards edges 14E-1 and 14E-2), material with perforations, etc. In arrangements where strands 32 are used to form diffusers, strands 32 may be more closely interlaced in the light-diffusing regions to form optical structures 52. The emitted light 38 from light-emitting diodes 44 passes through member 52 to form edge illumination. If desired, an additional diffusing structure such as edge diffuser 50 may be formed along each of edges 14E-1 and 14E-2 to help further diffuse and blend the light from light sources 44. Diffuser 50 may be a strand of material such as a silicone fiber that extends along the length L of each edge (e.g., perpendicular to the direction in which light 38 is emitted) or may be any other suitable diffusing structure.

Light-emitting diodes 44 are located in the middle of the strip of fabric 14 and extend along the length of the strip of fabric 14 in a one-dimensional array in the example of FIG. 7. If desired, light-emitting diodes 44 may be arranged in a two-dimensional array and/or there may be only one (or other small number) of light-emitting diodes 44 in edge illuminator 20. Light-emitting diodes 44 may include diodes of more than one color. For example, diodes 44 may include red diodes that emit red light, blue diodes that emit blue light, and/or green diodes that emit green light (as an example). Configurations in which diodes 44 include diodes of other colors (e.g., yellow, white, etc.) may also be used.

If desired, one or more attributes of the components and structures in edge illuminator 20 may be varied as a function of location along length L. For example, strand density (e.g., how closely strands 32 are interlaced), strand material, color of light 38, pitch of light sources 44, light-output capabilities of light sources 44, attributes of optical structures 52 and/or 50, and/or attributes of other structures in edge illuminator 20 may vary as a function of location along length L.

Figure 8:
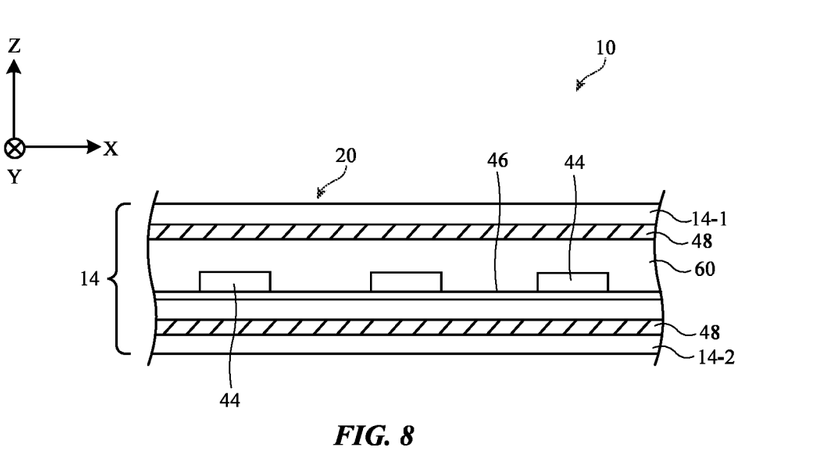
FIG. 8 is a cross-sectional side view of the wearable electronic device of FIG. 7 showing how an array of light sources may be interposed between one or more light-blocking and/or light-reflecting layers in accordance with an embodiment.

FIG. 8 is a cross sectional side view of device 10 of FIG. 7 taken along line 40 and viewed in direction 42. As shown in FIG. 8, fabric 14 may be formed from fabric portions such as fabric portions 14-1 and 14-2. Fabric portions 14-1 and 14-2 may be formed from interlaced strands 32 (e.g., woven strands of the type shown in FIG. 2 or strands that are knitted, braided, and/or otherwise interlaced to form fabric). For example, a first set of strands 32 may be used to form fabric portion 14-1 and a second set of strands 32 may be used to form fabric portion 14-2. Fabric portions 14-1 and 14-2 may be different portions of a single layer of fabric 14, or fabric portion 14-1 may form one or more first layers of fabric 14 and fabric portion 14-2 may form one or more second layers of fabric 14.

Interlacing equipment such as weaving equipment, knitting equipment, braiding equipment, or other suitable interlacing equipment may be used to form fabric 14. Fabric 14 may include pocket 60 (sometimes referred to as a gap, space, cavity, void, position, location, etc.) for receiving electrical components. Regions in fabric 14 that receive electrical components such as pocket 60 may be formed by creating a space or gap between portions of fabric 14 such as fabric portion 14-1 and fabric portion 14-2. The term "pocket" may be used to refer to a void between fabric portions and/or may be used to refer to a position or location between fabric portions (e.g., a position between strands of material in fabric 14, with or without an actual void).

Electrical components such as light sources 44 may be inserted into pocket 60 during the formation of fabric 14 or may be inserted into pocket 60 after fabric 14 is formed. If desired, light sources 44 may be electrically and/or mechanically connected to one or more conductive strands in pocket 60 (e.g., in arrangements where signal path 46 is formed from one or more conductive strands 32 in fabric 14).

As shown in FIG. 8, the inner surface of fabric portions 14-1 and 14-2 may be coated with light-reflecting layers such as light-reflecting layer 48. Light-reflecting layer 48 may be a layer of white plastic, a thin-film mirror, a metallic coating, and/or other reflective material. Light-reflecting layer 48 may be used to reflect light that has scattered towards upper and/or lower fabric portions 14-1 and 14-2. The light may be recycled and/or redirected to edge portions of device 10 (e.g., edges 14E-1 and 14E-2 of FIG. 7). If desired, layer 48 may include a light-absorbing layer instead of or in addition to a light-reflecting layer to prevent light from escaping through upper and lower fabric portions 14-1 and 14-2.

Figure 9:
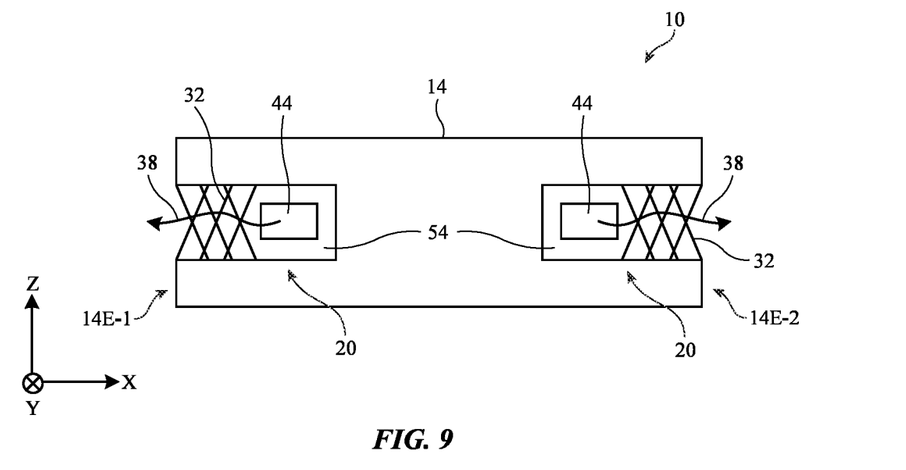
FIG. 9 is a cross-sectional side view of an illustrative wearable electronic device having first light sources forming a first edge illuminator on a first edge and second light sources forming a second edge illuminator on an opposing second edge in accordance with an embodiment.

FIG. 9 is a cross-sectional side view of device 10 in an illustrative arrangement in which edge illuminator 20 includes light sources 44 mounted at the edge of fabric 14 (e.g., instead of the central region of fabric 14, as in the example of FIG. 7). As shown in FIG. 9, a first edge illuminator 20 may include light sources 44 arranged in a one-dimensional array along a first edge of fabric 14 such as edge 14E-1. A second edge illuminator 20 may include light sources 44 arranged in a one-dimensional array along an opposing second edge of fabric 14 such as edge 14E-2. Fabric 14 may, for example, have side pockets such as side pockets 54 for receiving light sources 44. Fabric 14 may include multiple side pockets 54 along each edge for receiving individual light sources 44, or each edge of fabric 14 may have a single continuous side pocket 54 for receiving multiple light sources 44.

To give the appearance of continuous illumination, light sources 44 may emit light 38 through diffusing structures such as strands 32 having a higher density than the strands in other portions of fabric 14. Other diffusing structures such as transparent polymer or other transparent material with embedded light-scattering particles, material with perforations, and/or other diffusers may be used in addition to or instead of strands 32 in pockets 54.

Low-resolution displays such as edge illuminator 20 may be useful for providing notifications to a user without distracting the user from a present task. In particular, the color, pattern, and/or intensity of light from edge illuminator 20 may convey a sufficient amount of information so that the user understands the nature or source of the notification without providing so much information that the user is distracted by specific content within the notification. Control circuitry 16 may determine characteristics of visual output from edge illuminator 20 and/or of haptic output from haptic output devices 24 based on the importance (e.g., time-sensitivity) of the notification and/or based on the context of device 10 (e.g., based on data from sensors 22 and/or based on other contextual information such as the date, time of day, etc.). This type of context-adaptive visual output from edge illuminator 20 may be used to provide notifications that may or may not be associated with a primary display (e.g., a primary display 90 that shares a housing with edge illuminator 20) or primary device (e.g., a separate external electronic device such as device 80 having a display 90 with a two-dimensional array of pixels and/or having a head-mounted display configured to display augmented reality, virtual reality, and/or mixed reality image content).

Figure 10:
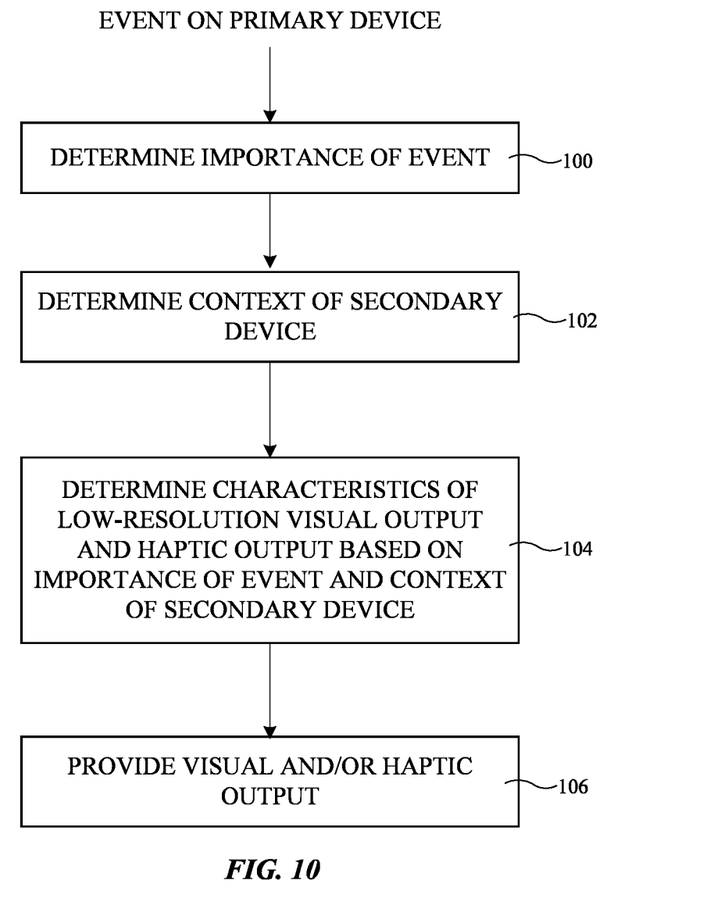
FIG. 10 is a flow chart of illustrative steps involved in using an edge illuminator to provide context-adaptive visual output that may be paired with haptic output in accordance with an embodiment.

FIG. 10 is a flow chart of illustrative steps involved in providing context-adaptive visual output and/or haptic output on device 10. In some arrangements, device 10 may serve as a secondary device that is used in conjunction with a primary device such as device 80 of FIG. 1 (e.g., a cellular telephone, laptop computer, tablet computer, wrist watch device, head-mounted device, television, and/or other suitable electronic device belonging to the user wearing device 10). In this type of scenario, an event on the primary device 80 (e.g., a device with a display 90 having a two-dimensional array of pixels) may trigger output on the secondary device (e.g., device 10). This type of scenario is described in FIG. 10. In other arrangements, however, the steps of FIG. 10 may take place without a primary device and/or independently of a primary device 10. The example of FIG. 10 in which an event on a primary device triggers output on device 10 is merely illustrative. If desired, the primary two-dimensional display 90 and the secondary one-dimensional display 20 may form part of a single electronic device with a shared housing.

In response to an event on a primary device 80 (e.g., a messaging notification, an incoming call notification, a social media notification, a calendar notification, a timer notification, a reminder notification, etc.), control circuitry 16 of device 10 and/or control circuitry 82 of device 80 may determine an importance of the event, as shown in block 100. This may include, for example, determining how time-sensitive the event is (e.g., whether the event is associated with a due date, timer, calendar, etc.), determining a source of the notification (e.g., which application the event is associated with such as a messaging application, calendar application, social media application, etc.), determining the identity of the person associated with the event (e.g., whether the sender of a message or email is a family member, colleague, unknown individual, etc.), determining whether any existing user preferences are associated with the event, and/or determining other information that indicates a level of importance of the event.

During the operations of block 102, control circuitry 16 of device 10 and/or control circuitry 82 of device 80 may determine the context of device 10 (e.g., the secondary device in this example). For example, control circuitry 16 and/or control circuitry 82 may determine the location of device 10 (e.g., home, work, gym, car, etc.), the movements of device 10, whether device 10 is being used during exercise, work, school, bedtime, sleep, driving, etc., and/or may determine other information about the context in which device 10 is operating. If desired, sensors in device 10 such as a motion sensor may detect hand motions and/or finger movements being made by the hand wearing device 10.

During the operations of block 104, control circuitry 16 of device 10 and/or control circuitry 82 of device 80 may determine characteristics of visual output from edge illuminator 20 and/or haptic output from haptic output devices 24 based on the importance of the event (determined during the operations of block 100) and based on the context of device 10 (determined during the operations of block 102). This may include, for example, determining the color(s), intensity, pattern, and/or other characteristics of illumination from edge illuminator 20 and the intensity and pattern of haptic feedback from haptic output devices 24.

During the operations of block 106, control circuitry 16 of device 10 and/or control circuitry 82 of device 80 may use edge illuminator 20 to provide the selected type of visual output and may use haptic output devices 24 to provide the selected type of haptic output. If desired, device 10 and/or device 80 may monitor for user input during and/or immediately after providing visual output and/or haptic output. For example, sensors in device 10 and/or device 80 may monitor hand movements and/or finger gestures that may be used to interact with the visual or haptic output. A hand waving gesture or other user input may be used to silence or turn off the output, a pinch-to-zoom hand gesture or other user input may be used to obtain more information about the notification associated with the output, and/or other user input may be used to otherwise interact with the visual output and/or haptic output on device 10.

As described above, one aspect of the present technology is the gathering and use of information such as sensor information. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

The foregoing is merely illustrative and various modifications can be made to the described embodiments. The foregoing embodiments may be implemented individually or in any combination.

What is claimed is:

1. A fabric band, comprising:
   first and second fabric portions arranged in a strip having first and second edges that extend along a length of the strip;
   an array of light sources interposed between the first and second fabric portions, wherein the array of light sources is configured to emit light towards the first and second edges; and
   light-diffusing structures that diffuse the light before the light exits the fabric band through the first and second edges.

2. The fabric band defined in claim 1 wherein the light sources comprise light-emitting diodes.

3. The fabric band defined in claim 1 wherein the strip extends around a longitudinal axis and wherein the array of light sources emits the light parallel to the longitudinal axis.

4. The fabric band defined in claim 1 further comprising a light-reflecting layer on an inner surface of the first fabric portion.

5. The fabric band defined in claim 1 wherein the light-diffusing structures comprise strands of material.

6. The fabric band defined in claim 1 wherein the light that is emitted towards the first edge forms a first edge illuminator extending along the length of the strip and the light that is emitted towards the second edge forms a second edge illuminator extending along the length of the strip.

7. The fabric band defined in claim 1 further comprising control circuitry that controls the light sources based on an event occurring on an external electronic device.

8. The fabric band defined in claim 7 wherein the control circuitry controls the light sources based on an importance of the event and based on a context of the fabric band.

9. The fabric band defined in claim 1 wherein the light sources are individually addressable.

10. The fabric band defined in claim 1 wherein the array of light sources comprises a one-dimensional array of light sources.

11. A wrist band, comprising:
    fabric that wraps around a longitudinal axis;
    light sources embedded in the fabric that emit light parallel to the longitudinal axis to form edge illumination that extends continuously along an edge of the wrist band; and
    control circuitry that controls the edge illumination based on an event on an external electronic device.

12. The wrist band defined in claim 11 wherein the fabric comprises a side pocket facing the edge and wherein at least one of the light sources is located in the side pocket.

13. The wrist band defined in claim 12 wherein the fabric comprises strands of material that diffuse the light at the edge of the wrist band.

14. The wrist band defined in claim 13 wherein the light sources comprise a one-dimensional array of light-emitting diodes.

15. The wrist band defined in claim 14 further comprising:
a light-reflecting layer that overlaps the one-dimensional array of light-emitting diodes.

16. An electronic device, comprising:
first and second strips of fabric;
a one-dimensional array of light sources interposed between the first and second strips of fabric that produces edge illumination along an edge extending between the first and second strips of fabric; and
a diffuser configured to blend the edge illumination from the one-dimensional array of light sources so that the edge illumination is continuous along the edge.

17. The electronic device defined in claim 16 wherein the edge illumination comprises different colors of light.

18. The electronic device defined in claim 17 wherein the edge illumination is associated with a notification received on an external electronic device.

19. The electronic device defined in claim 18 wherein the notification is associated with a given set of colors and wherein the different colors of light in the edge illumination includes the given set of colors.

20. The electronic device defined in claim 19 further comprising a haptic output device configured to provide haptic output while the one-dimensional array of light sources produces the edge illumination.

* * * * *